United States Patent [19]

Gladstone

[11] Patent Number: 4,887,556
[45] Date of Patent: Dec. 19, 1989

[54] ARRANGEMENT FOR AND METHOD OF SUPPLYING HYDROGEN GAS

[76] Inventor: Ernest Gladstone, 721 Avenue O, Brooklyn, N.Y. 11230

[21] Appl. No.: 307,535

[22] Filed: Feb. 8, 1989

[51] Int. Cl.⁴ .............................................. F02B 75/12
[52] U.S. Cl. ............................ 123/1 A; 123/DIG. 12; 123/525
[58] Field of Search ........................ 123/1 A, DIG. 12

[56] References Cited

U.S. PATENT DOCUMENTS

| | | | |
|---|---|---|---|
| 4,211,537 | 7/1980 | Teitel | 123/DIG. 12 |
| 4,226,213 | 10/1980 | Bernauer | 123/DIG. 12 |
| 4,253,428 | 3/1981 | Billings et al. | 123/DIG. 12 |
| 4,328,768 | 5/1982 | Tracy et al. | 123/DIG. 12 |
| 4,343,770 | 8/1982 | Simons | 123/DIG. 12 |
| 4,520,763 | 6/1985 | Lynch et al. | 123/DIG. 12 |
| 4,570,446 | 2/1986 | Matsubara et al. | 123/DIG. 12 |

Primary Examiner—E. Rollins Cross

[57] ABSTRACT

Iron filings are contained in a lightweight, compact storage tank for storing pressurized hydrogen gas safely. Sensors detect the tank pressure and control an assembly for stirring the iron filings whenever the tank pressure reaches predetermined set-points. Hydrogen gas is collected in increased quantities during filling, and is released in increased quantities during use due to such stirring action.

11 Claims, 1 Drawing Sheet

ARRANGEMENT FOR AND METHOD OF SUPPLYING HYDROGEN GAS

BACKGROUND OF THE INVENTION

1. Field of the Invention

This invention generally relates to an arrangement for, and a method of, supplying hydrogen gas and, more particularly, to a storage tank for supplying stored presurized hydrogen gas as a fuel to power transport vehicles.

2. Description of Related Art

Hydrogen is an excellent fuel for powering transport vehicles, particularly when environmental concerns are paramount. Hydrogen can be cryogenically stored in tanks for air transport, but not, as a practical matter, at a reasonable cost for land transport. In addition, trained crews for safely handling the hydrogen fuel are not available for land transport, as opposed to air transport.

It has been proposed to store hydrogen in tanks having hydrogen-adsorbent host materials on-board commercial land vehicles such as buses, because such storage is safe in case of tank rupture. However, experience has shown that the hydrogen interacts with the host materials over prolonged use, causing dust to be produced, thus dictating that the host materials each be relatively large-sized metal spheres on the order of about ¾" in diameter so that the dust settles in the voids between the large aggregates, thus not clogging the gas passages and covering the surfaces of the host materials. Such large-sized metal spheres present a correspondingly small total surface area on which the hydrogen gas can be collected. This limits the amount of hydrogen that can be stored in relationship to the volume of the aggregate and its weight (if the aggregate were of smaller size, the collective surface areas would be far greater in terms of same weight and volume). Attempts to substantially reduce the size of such large-sized spheres to a powder form for increasing the total surface area presented to the hydrogen have not proven altogether satisfactory, as only the surface area of the pile of powder is exposed to the atmosphere of the storage tank, and since the powder tended to cause the tank to become clogged, particularly over repeated re-fillings of the tank. Also, the large-sized spheres had to be accommodated in a correspondingly large-sized heavy tank. However, a tank of large size and weight is not entirely suitable for cars and, in any event, detracts from energy efficiency and the benefits of compact storage as promised by the inherently small-sized, compact hydrogen molecule, absorbing on the surface of the host material. The capacity of hydrogen storage with ¾" diameter aggregates has been seen to be twice that of the same volume tank filled solely with liquid hydrogen.

SUMMARY OF THE INVENTION

1. Objects of the Invention

It is a general object of this invention to safely store huge volumes of hydrogen gas in a tank of lightweight and compact volume.

It is another object of this invention to present the hydrogen gas to host materials having a relatively large total surface area for maximizing the amount of hydrogen gas stored in such a tank.

Another object of this invention is to reliably and efficiently power a transport vehicle, particularly a car, without adversely impacting the environment with the by-products of hydrocarbon combustion.

Yet another object of this invention is, when desired, to refill the transport under factory conditions at intervals of 10,000 miles of use or more.

2. Features of the Invention

In keeping with these objects, and others which will become apparent hereinafter, one feature of this invention resides, briefly stated, in an arrangement for, and a method of, supplying hydrogen gas as a fuel for powering virtually any drive, particularly one for driving a land transport vehicle, or to safely store hydrogen gas in high volumes for use by stationary plants for power.

In accordance with this invention, a lightweight, compact storage tank, preferably made of fiberglass, has an interior, an inlet for introducing hydrogen gas at supra-atmospheric pressure into the tank interior, and an outlet for discharging the pressurized hydrogen gas from the tank interior to the drive, e.g. a combustion chamber. A multitude of hydrogen-collecting host materials are contained in the tank interior for adsorbing the pressurized hydrogen gas on outer surfaces of the host materials.

This invention further comprises pressure sensor means for detecting the pressure of the pressurized hydrogen gas within the tank interior, and for generating a control signal when the detected pressure is below a predetermined threshold during use. Stirrer means responsive to the generation of the control signal are operative for stirring the host materials to release hydrogen gas adsorbed thereon.

According to a preferred embodiment, the host materials are magnetically susceptible, are particulate in form, each particle measuring between about 50 microns to about one millimeter in diameter, and are constituted of iron. These magnetically susceptible materials are advantageously stirred by electromagnetic means operative for generating a moving magnetic field within the tank interior. The electromagnetic means includes an electrical power source for generating electrical current, a coil wound about the tank, and switching means between the power source and the coil for interrupting the flow of current to the coil.

The pressure sensor means advantageously includes a use sensor and a fill sensor both mounted on the tank and extending into the tank interior. During introduction of hydrogen gas into the tank inlet, the fill sensor is operative for generating a fill signal when the detected pressure exceeds a pre-established value during filling of the tank. The stirrer means is also responsive to the generation of the fill signal for stirring the host materials to expose their outer surfaces to adsorb additional quantities of hydrogen gas.

Hence, the host materials are stirred not only during filling, but also during use of the tank. As the host materials are stirred during filling when the detected pressure exceeds the aforementioned pre-established value, more and more of the outer surfaces of the host materials are exposed so that more and more of the hydrogen gas can be adsorbed on the host materials.

As the host materials are stirred during tank use whenever the detected pressure is below a predetermined threshold, more and more of the outer surfaces of the host materials are exposed to release the hydrogen gas previously adsorbed thereon.

In order to prevent tank contamination between the interior and exterior of the tank, a normally closed valve is provided at the tank inlet. This valve is openable during introduction of the hydrogen gas.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
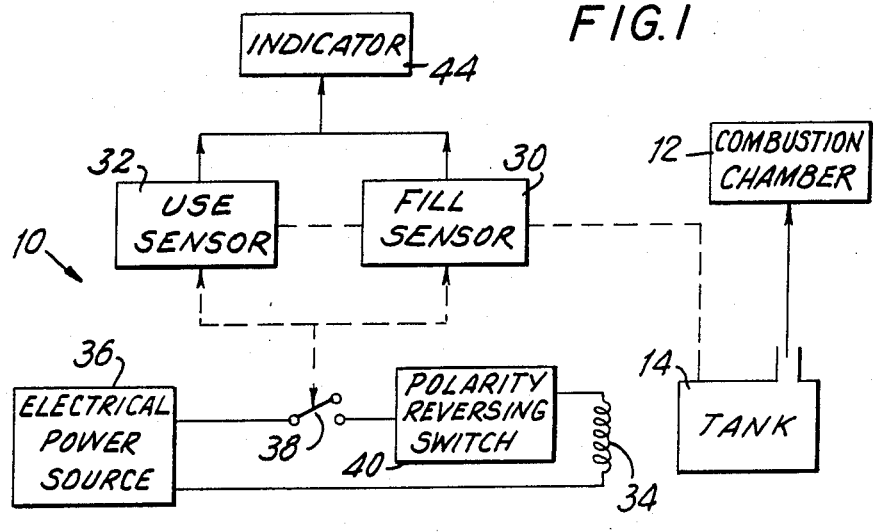
FIG. 1 is a part-schematic, block diagram of an arrangement for supplying hydrogen gas as a fuel in accordance with the method of this invention.

Referring now to the drawings, reference numeral 10 generally identifies an arrangement for supplying hydrogen gas as a fuel according to the method of this invention. As described herein, the hydrogen gas is used to power a combustion chamber 12, particularly one used to drive a transport vehicle. However, it will be expressly understood that this invention is not intended to be so limited, since the hydrogen gas can be used to power any load, and not necessarily a vehicle.

Figure 2:
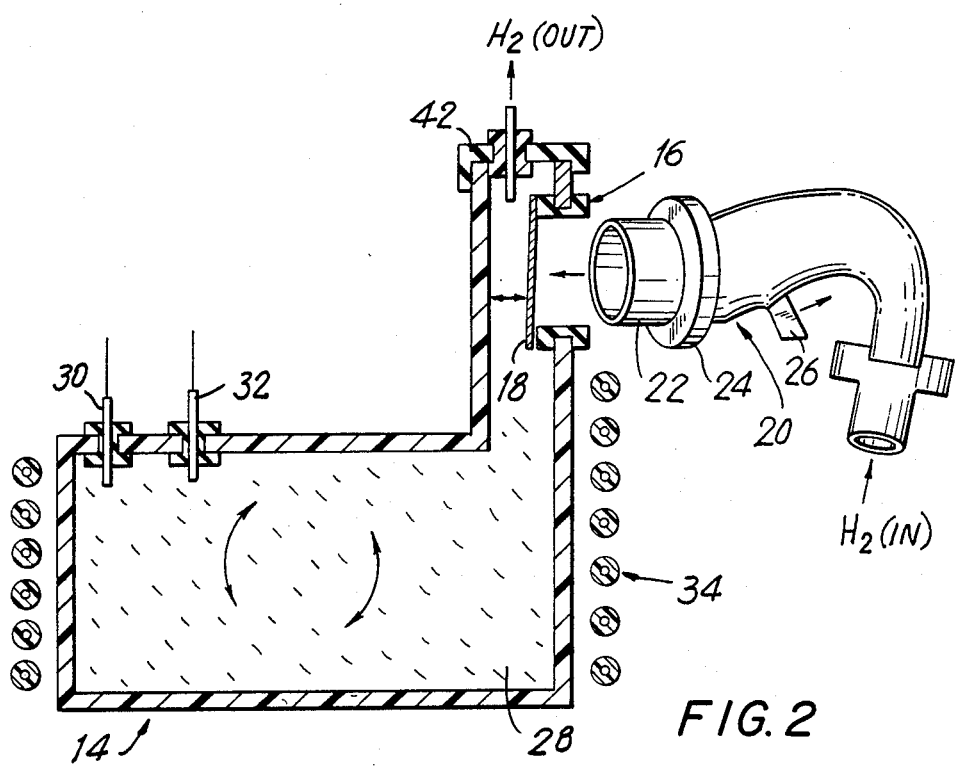
FIG. 2 is an enlarged, partly-sectioned view of part of the arrangement of FIG. 1.

The arrangement 10 includes a lightweight, compact storage tank 14, best shown in FIG. 2. Tank 14 is preferably constituted of a non-ferrous material, e.g., reinforced fiberglass resin. Tank 14 has an inlet 16 bounding an opening normally closed by a valve 18 to prevent the interior of the tank from being contaminated by the ambient exterior environment, because such contamination of the surface of the host material will negatively affect its adsorbent property. A filler nozzle 20 has a spout 22 insertable into the valve opening to open the valve. A flange 24 sealingly abuts against a side wall of the tank during filling. Upon depression of a trigger 26, hydrogen gas is introduced from a non-illustrated supply at supra-atmospheric pressure through the nozzle 20 into the tank interior. When the nozzle is removed, the valve 18 automatically closes, thereby insuring that the contents of the tank will not be contaminated by contaminants outside the tank, e.g. oxygen, nitrogen, dirt, moisture, etc.

A multitude of hydrogen-collecting host materials 28 are contained within the tank. The host materials are operative for adsorbing the pressurized hydrogen gas on exposed outer surfaces of the host materials. The smaller the host materials, the greater their total outer surface area and, hence, it is preferred that the host materials be particulate in form, with each particle having a mean diameter on the order of at least 50 microns and at most about one millimeter. Any material capable of adsorbing hydrogen gas on its outer surface will suffice. Pulverized pure iron filings or activated iron-titanium oxides are currently preferred.

A fill sensor 30 and a use sensor 32 are mounted on the tank and extend into the tank interior. Each sensor is operative for detecting the pressure of the pressurized hydrogen gas within the tank, and for generating an output signal when the detected pressure reaches a certain value. In the case of the fill sensor 30 which operates when the tank is being filled with hydrogen gas via the inlet 18, the output signal is generated when the detected pressure exceeds a preselected upper limit. In the case of the use sensor 32 which operates when the tank is supplying hydrogen gas via outlet 42, the output signal is generated when the detected pressure is below a predetermined lower limit.

Whenever either aforementioned output signal is generated, a stirrer assembly is actuated. The stirrer assembly includes, in a preferred embodiment, an electromagnetic coil 34 wound about the tank 14, an electrical power source 36 operative for supplying alternating current or direct current, and a switch 38 controlled by either sensor 30 or 32 to be moved between closed and open states. In the closed state, electrical current flows to the coil, thereby generating a magnetic field within the tank for stirring the host materials, the latter being preferably of a ferrous magnetically-susceptible nature. In the open state of the switch 38, the flow of the electrical current is interrupted, thereby causing the magnetic field in the tank to collapse, again stirring the host materials. Each time the host materials are stirred by the build-up and collapse of the magnetic field, more of their total outer surface area is exposed. A polarity-reversing switch 40 can also be inserted between the power source and the coil in order to repetitively build up and collapse the magnetic field a plurality of times per second, thereby more vigorously churning the host materials.

To fill the tank, an operator actuates a fill switch, typically mounted on a car dashboard, to actuate the fill sensor 30. The filling nozzle 20 is inserted into the tank inlet 18 in order to admit the hydrogen gas under pressure of approximately 2½ atmospheres. The fill sensor 30 is operative to close the switch 38, thereby stirring the host materials and exposing more of their outer surfaces to adsorb additional quantities of hydrogen gas than would have been the case if the host materials were not stirred. When the fill sensor detects a constant pressure of about 2½ atmospheres for a given period of time, e.g. 30 seconds, then the tank is deemed to be full, and the fill sensor is operative for opening the switch 38, thereby stopping the stirring action. The operator de-actuates the fill switch on the dashboard to complete the filling procedure and, by doing so, actuates a use switch, also typically mounted on the dashboard, in order to actuate the use sensor 32.

During use, e.g. when driving a car powered by the hydrogen gas being burned in combustion chamber 12, the hydrogen gas is discharged from the tank outlet 42 on an as-needed basis. As the gas is consumed, the internal tank pressure decreases. When the pressure is below a predetermined threshold, e.g. 1½ atmospheres, the use sensor 32 actuates the stirrer assembly by closing switch 38 and exposing more of the outer surfaces of the host materials. By doing so, more hydrogen gas is released and the internal tank pressure is increased. This procedure continues until further stirring no longer causes additional hydrogen gas to be released, in which case, the tank is now deemed to be empty. The operator de-actuates the use switch on the dashboard, and the tank is ready for a refill.

An indicator 44 is connected to both sensors 30, 32, and advantageously is an electrical lamp located within view of the operator on the dashboard. The indicator 44 is normally extinguished, but is lit whenever the tank is empty and needs refilling during the use mode of operation, or when the tank is full during the filling mode.

Rather than using a single indicator 44 to indicate the empty or full condition of the tank, separate indicators may be employed. Also, rather than using two separate sensors 30, 32, a single pressure sensor having a two-position switch could be substituted therefor.

Depending on the size of the host materials, the storage capacity of the tank can be varied. Halving the size of the host materials, assuming they are spheres, while utilizing the same quantity of the host materials, increases their numbers by a factor of approximately 16 and increases their total outer surface area by a factor of approximately 4. Hence, the smaller the size of the host materials, the greater the storage tank capacity and the further the vehicle can be driven on a single tankful. It is envisioned that a single tankful can power a vehicle for 10,000 or more miles, thereby rendering a fill-up an infrequent event and, in fact, an activity that can be scheduled on an annual basis at a dealership or service center where trained personnel are available for the safe handling of the hydrogen gas. In the factory refill, liquid hydrogen should be introduced into the tank, instead of gaseous hydrogen. The heat of absorption will gasify the liquid, making the process quicker.

Other means for stirring the host materials are also contemplated. For example, a mechanical mixer, e.g., a motor-driven blade assembly, can be mounted within the tank to agitate the host materials. In addition, an electrostatic agitator, having oppositely-charged electrodes located on opposite sides of the tank, can cooperate with electrostatically-charged host material particles to move the latter between the electrodes.

It will be understood that each of the elements described above, or two or more together, also may find a useful application in other types of constructions differing from the types described above.

While the invention has been illustrated and described as embodied in an arrangement for and method of supplying hydrogen gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for supplying hydrogen gas as a fuel, comprising:
    a lightweight, compact storage tank having an interior, an inlet for introducing hydrogen gas at supra-atmospheric pressure into the interior, and an outlet for discharging the pressurized hydrogen gas from the interior of the tank;
    a multitude of hydrogen-collecting host materials in the interior, for adsorbing the pressurized hydrogen gas on outer surfaces of the host materials;
    pressure sensor means for detecting the pressure of the pressurized hydrogen gas within the interior of the tank, and for generating a control signal when the detected pressure is below a predetermined threshold during use; and
    stirrer means responsive to the generation of the control signal, for stirring the host materials to release hydrogen gas adsorbed thereon.

2. The arrangement as recited in claim 1, wherein the host materials are magnetically-susceptible materials, and wherein the stirrer means includes electromagnetic means for generating a moving magnetic field within the interior of the tank.

3. The arrangement as recited in claim 2, wherein the electromagnetic means includes an electrical power source for generating an electrical current, a coil wound about the tank, and switching means between the power source and the coil for interrupting the flow of current to the coil.

4. The arrangement as recited in claim 1; and further comprising means for indicating when the detected pressure is below the predetermined threshold.

5. The arrangement as recited in claim 1, wherein the pressure sensor means includes a use sensor mounted on the tank and extending the tank interior, and also includes a fill sensor means mounted on the tank and extending into the tank interior, said fill sensor being operative, during introduction of hydrogen gas into the inlet, for generating a fill signal when the detected pressure exceeds a pre-established value during filling of the tank; and wherein the stirrer means is responsive to the generation of the fill signal, for stirring the host materials to expose their outer surfaces to adsorb additional quantities of hydrogen gas.

6. The arrangement as recited in claim 1, wherein the tank is constituted of fiberglass.

7. The arrangement as recited in claim 1, wherein the host materials are particulate in form, each particle measuring between about 50 microns to about one millimeter in diameter.

8. The arrangement as recited in claim 7, wherein the host materials are iron filings.

9. The arrangement as recited in claim 1, wherein the inlet includes a normally closed valve for preventing contamination of the tank interior with the exterior environment, said valve being openable during introduction of the hydrogen gas.

10. A method of supplying hydrogen gas as a fuel, comprising the steps of:
    introducing hydrogen gas at supra-atmospheric a tank interior;
    filling the tank interior with a multitude of hydrogen-collecting host materials, for adsorbing the pressurized hydrogen gas on outer surfaces of the host materials;
    detecting the pressure of the pressurized hydrogen gas within the interior of the tank, and generating a control signal when the detected pressure is below a predetermined threshold during use;
    stirring the host materials to release hydrogen gas adsorbed thereon in response to generation of the control signal; and
    discharging the pressurized hydrogen gas from the tank interior.

11. A method of supplying hydrogen as a fuel, comprising the steps of:
    introducing liquid hydrogen into a tank interior, the liquid hydrogen forming hydrogen gas at supra-atmospheric pressure;
    filling the tank interior with a multitude of hydrogen-collecting host materials, for adsorbing the pressurized hydrogen gas on outer surfaces of the host materials;
    detecting the pressure of the pressurized hydrogen gas within the interior of the tank, and generating a control signal when the detected pressure is below a predetermined threshold during use;
    stirring the host materials to release hydrogen gas adsorbed thereon in response to generation of the control signal; and
    discharging the pressurized hydrogen gas from the tank interior.

* * * * *